US006754836B2

(12) United States Patent
Shimizu et al.

(10) Patent No.: US 6,754,836 B2
(45) Date of Patent: Jun. 22, 2004

(54) MICROCOMPUTER CAPABLE OF SWITCHING BETWEEN LOW CURRENT CONSUMPTION MODE AND NORMAL OPERATION MODE

(75) Inventors: Yoshihiro Shimizu, Hyogo (JP); Shinji Takeda, Tokyo (JP); Sachiko Kawaguchi, Hyogo (JP)

(73) Assignees: Renesas Technology Corp., Tokyo (JP); Mitsubishi Electric Semiconductor Application Engineering Corporation, Tokyo (JP)

( * ) Notice: Subject to any disclaimer, the term of this patent is extended or adjusted under 35 U.S.C. 154(b) by 600 days.

(21) Appl. No.: 09/730,841

(22) Filed: Dec. 7, 2000

(65) Prior Publication Data

US 2002/0087905 A1 Jul. 4, 2002

(30) Foreign Application Priority Data

Jun. 7, 2000 (JP) ........................................ 2000-171000

(51) Int. Cl.[7] .............................. G06F 1/32; G05B 23/02
(52) U.S. Cl. .................. 713/320; 713/323; 340/825.09
(58) Field of Search ................................. 713/300, 322, 713/323, 320; 340/825.69

(56) References Cited

U.S. PATENT DOCUMENTS

| | | | | |
|---|---|---|---|---|
| 5,799,198 A | * | 8/1998 | Fung | 713/323 |
| 5,815,213 A | * | 9/1998 | Meunier | 348/533 |
| 5,930,516 A | * | 7/1999 | Watts et al. | 713/322 |
| 5,950,222 A | * | 9/1999 | Yamada et al. | 711/103 |
| 5,991,849 A | * | 11/1999 | Yamada et al. | 711/103 |
| 6,061,801 A | * | 5/2000 | Divoux | 713/322 |
| 6,225,916 B1 | * | 5/2001 | Sugimoto et al. | 340/825.69 |

FOREIGN PATENT DOCUMENTS

| | | | |
|---|---|---|---|
| JP | 1-195546 | * | 8/1989 |
| JP | 9-191569 | | 7/1997 |

OTHER PUBLICATIONS

"Method to Provide Low Power Standby Mode for Online Devices", IBM Technical Disclosure Bulletin, Apr. 1987, vol. 29, pp 4763.*

* cited by examiner

Primary Examiner—Thomas Lee
Assistant Examiner—Chun Cao
(74) Attorney, Agent, or Firm—Burns, Doane, Swecker & Mathis, L.L.P.

(57) ABSTRACT

A microcomputer includes reloadable registers for prestoring count values corresponding to an ineffective interval and an effective interval which are set in accordance with the timing of a first edge and a second edge of a head pulse signal, and for setting these count values sequentially into a counter. Only when the first edge and second edge are input at predetermined timing through an event input terminal, that is, only when the head pulse signal is input, the interrupt signal is generated for changing the operation mode from a low current consumption mode to a normal operation mode. This makes it possible to prevent a mode transition due to noise, and reduce the power consumption of the microcomputer by making more effective use of the low current consumption mode by improving a mode transition identification rate.

6 Claims, 10 Drawing Sheets

MICROCOMPUTER CAPABLE OF SWITCHING BETWEEN LOW CURRENT CONSUMPTION MODE AND NORMAL OPERATION MODE

BACKGROUND OF THE INVENTION

1. Field of the Invention

The present invention relates to a microcomputer which is installed in electronic equipment such as a video cassette recorder, for example, and has a low current consumption mode and a normal operation mode.

2. Description of Related Art

FIGS. 9 and 10 are block diagrams showing a configuration of a conventional microcomputer disclosed in Japanese patent application laid-open No. 9-191569/1997, for example: FIG. 9 shows an operation in the low current consumption mode; and FIG. 10 shows an operation in the normal operation mode.

In these figures, the reference numeral 1 designates a microcomputer installed in electronic equipment or the like such as a video cassette recorder; 2 designates an oscillator with an oscillation frequency of the main clock 2a; 3 designates an oscillator with an oscillation frequency of the sub-clock 3a; 4 designates a CPU; 5 designates a timing generator for generating an operation clock signal of the CPU 4 in response to the oscillation frequency of the output signal from the oscillator 2 or 3; 6 designates peripheral hardware for switching the mode of the microcomputer 1 from the low current consumption mode to the normal operation mode in response to the detection of an edge of a pulse signal 8 from a remote controller.

Next, the operation of the conventional microcomputer will be described.

In FIGS. 9 and 10, to reduce useless power consumption during power down, the microcomputer 1 installed in the electronic equipment or the like includes the oscillator 3 of the sub-clock 3a for small current consumption in addition to the oscillator 2 of the main clock 2a. The microcomputer changes its operation mode from the low current consumption mode using the sub-clock 3a as the system clock to the normal operation mode using the main clock 2a as the system clock in response to an event.

In the low current consumption mode as shown in FIG. 9, the shadowed oscillator 2, CPU 4 and timing generator 5 are halted, with only the peripheral hardware 6 being operable according to the sub-clock 3a based on the oscillator 3.

When the pulse signal 8 associated with an external event is input from the remote controller to the peripheral hardware 6 in the low current consumption mode, the peripheral hardware 6, detecting an edge of the pulse signal 8, activates the oscillator 2 of the main clock 2a, and activates the timing generator 5 to generate the operation clock signal of the CPU 4, thereby bringing the CPU 4 into operation.

Thus, the peripheral hardware 6 switches the operation mode from the low current consumption mode using the sub-clock 3a as the system clock to the normal operation mode using the main clock 2a as the system clock in response to the detection of the edge of the pulse signal 8 from the remote controller.

In the conventional microcomputer with the foregoing configuration, the peripheral hardware 6 switches the operation mode from the low current consumption mode to the normal operation mode in response to the detection of the pulse signal 8 from the remote controller. This offers a problem of accidentally changing the mode to the normal operation mode because the peripheral hardware 6 can erroneously detect the noise or the like supplied thereto as the edge of the pulse signal 8, thereby increasing the power consumption.

SUMMARY OF THE INVENTION

The present invention is implemented to solve the foregoing problem. It is therefore an object of the present invention to provide a microcomputer capable of reducing the power consumption by making more effective use of the low current consumption mode by improving a mode transition identification rate.

According to a first aspect of the present invention, there is provided a microcomputer comprising: an edge detector for detecting a first edge and a second edge of a pulse signal supplied from a remote controller; effective interval setting means for setting an effective interval after a predetermined time period has elapsed from the time the edge detector detects the first edge; and interrupt control means for generating an interrupt signal for changing an operation mode from a low current consumption mode to a normal operation mode when the edge detector detects the second edge during the effective interval.

Here, the effective interval setting means may comprises a plurality of reloadable registers for holding count values corresponding to the predetermined time period and to the effective interval; and a counter for counting each of the count values held in the reloadable registers to determine the predetermined time period and the effective interval.

The effective interval setting means may comprises a counter for counting a count value according to count sources corresponding to the predetermined time period and the effective interval, and for setting the predetermined time period and effective interval in response to an overflow of the counter.

According to a second aspect of the present invention, there is provided a microcomputer comprising: an edge detector for detecting a first edge, a second edge and a third edge of a pulse signal supplied from a remote controller; effective interval setting means for setting a first effective interval after a first predetermined time period has elapsed from the time the edge detector detects the first edge, and for setting a second effective interval after a second predetermined time period has elapsed from the time the edge detector detects the second edge during the first effective interval; and interrupt control means for generating an interrupt signal for changing an operation mode from a low current consumption mode to a normal operation mode when the edge detector detects the third edge during the second effective interval.

Here, the effective interval setting means may comprises a plurality of reloadable registers for holding count values corresponding to the first and second predetermined time periods and to the first and second effective intervals; and a counter for counting each of the count values held in the reloadable registers to determine the first and second predetermined time periods and the first and second effective intervals.

The effective interval setting means may comprise a counter for counting a count value according to count sources corresponding to the first and second predetermined time periods and to the first and second effective intervals, and for setting the first and second predetermined time periods and the first and second effective intervals in response to an overflow of the counter.

DETAILED DESCRIPTION OF THE PREFERRED EMBODIMENTS

The invention will now be described with reference to the accompanying drawings.

Embodiment 1

Figure 1:
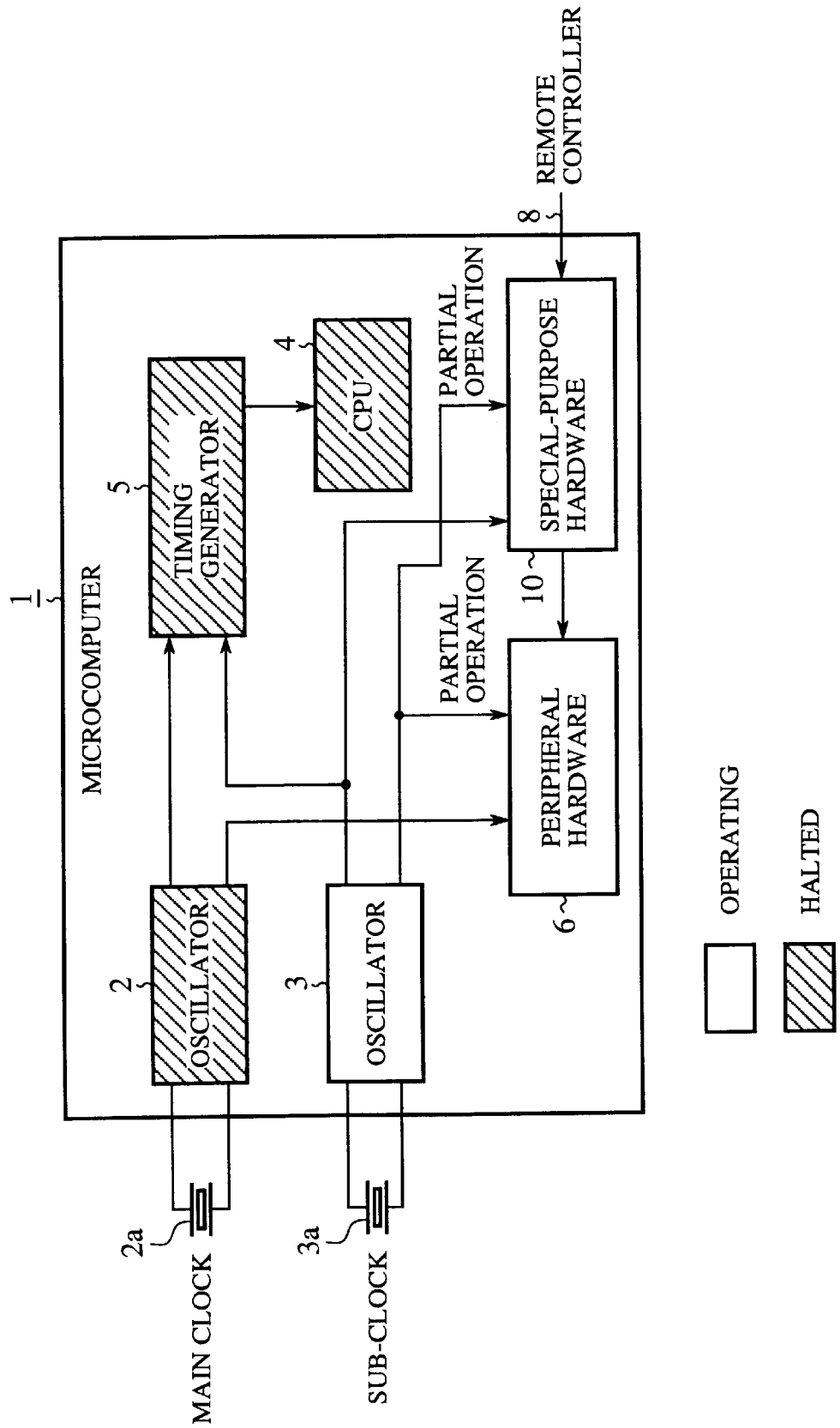
FIG. 1 is a block diagram showing a configuration of an embodiment 1 of a microcomputer in accordance with the present invention, in which the microcomputer is in a low current consumption mode.
Figure 2:
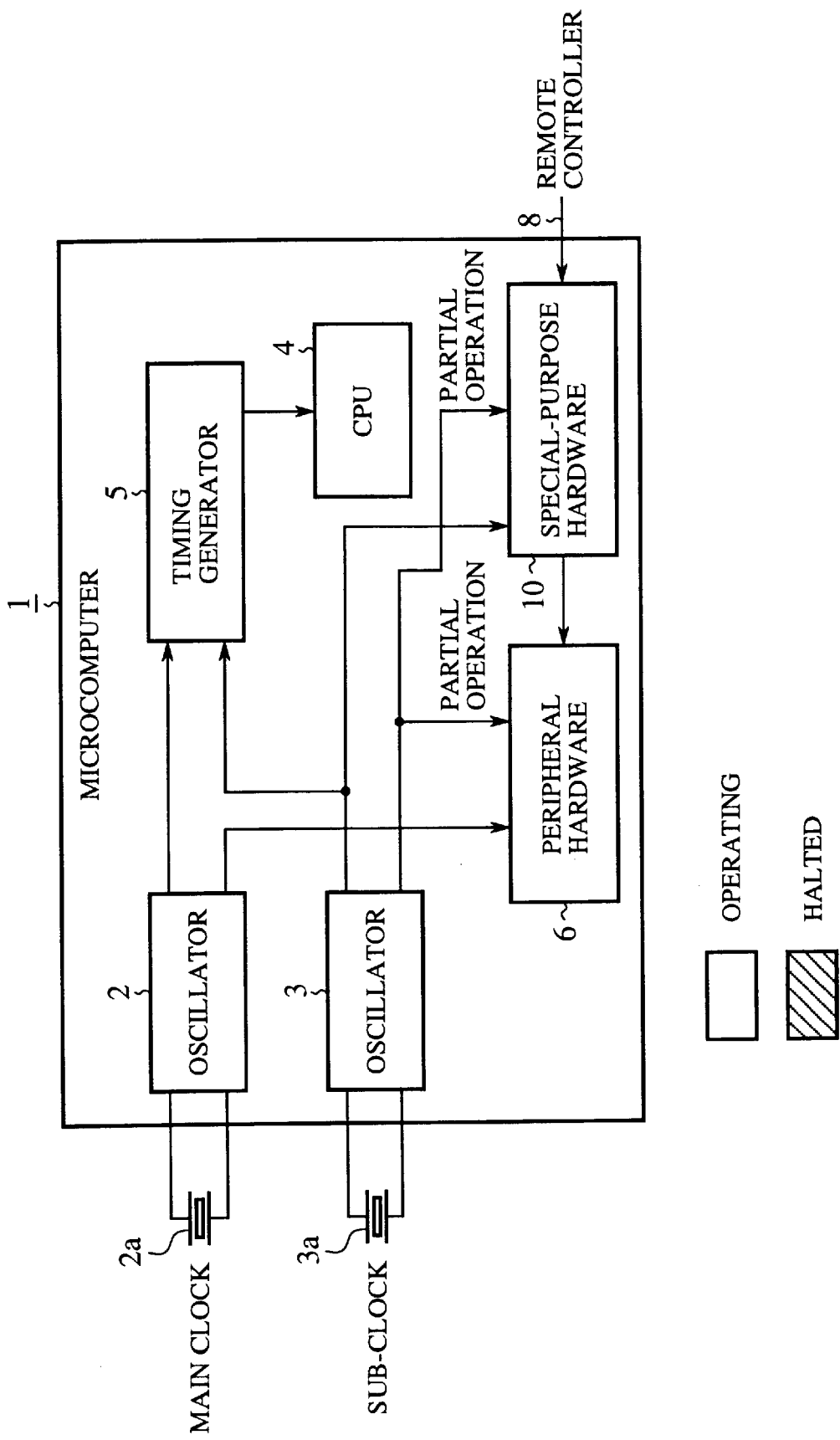
FIG. 2 is a block diagram showing a configuration of the embodiment 1 of the microcomputer, in which the microcomputer is in a normal operation mode.

FIGS. 1 and 2 are block diagrams showing a configuration of an embodiment 1 of a microcomputer in accordance with the present invention: FIG. 1 shows an operation in the low current consumption mode; and FIG. 2 shows an operation in the normal operation mode.

In these figures, the reference numeral 1 designates a microcomputer installed in electronic equipment or the like such as a video cassette recorder; 2 designates an oscillator with an oscillation frequency of the main clock 2a; 3 designates an oscillator with an oscillation frequency of the sub-clock 3a; 4 designates a CPU; 5 designates a timing generator for generating an operation clock signal of the CPU 4 in response to the oscillation frequency of the output signal from the oscillator 2 or 3; 6 designates peripheral hardware for changing the mode of the microcomputer 1 from the low current consumption mode to the normal operation mode in response to an interrupt signal from special-purpose hardware; and 10 designates the special-purpose hardware for detecting an edge of a pulse signal 8 from a remote controller, and for supplying the peripheral hardware 6 with the interrupt signal when identifying the pulse signal 8 as a head pulse signal.

Figure 3:
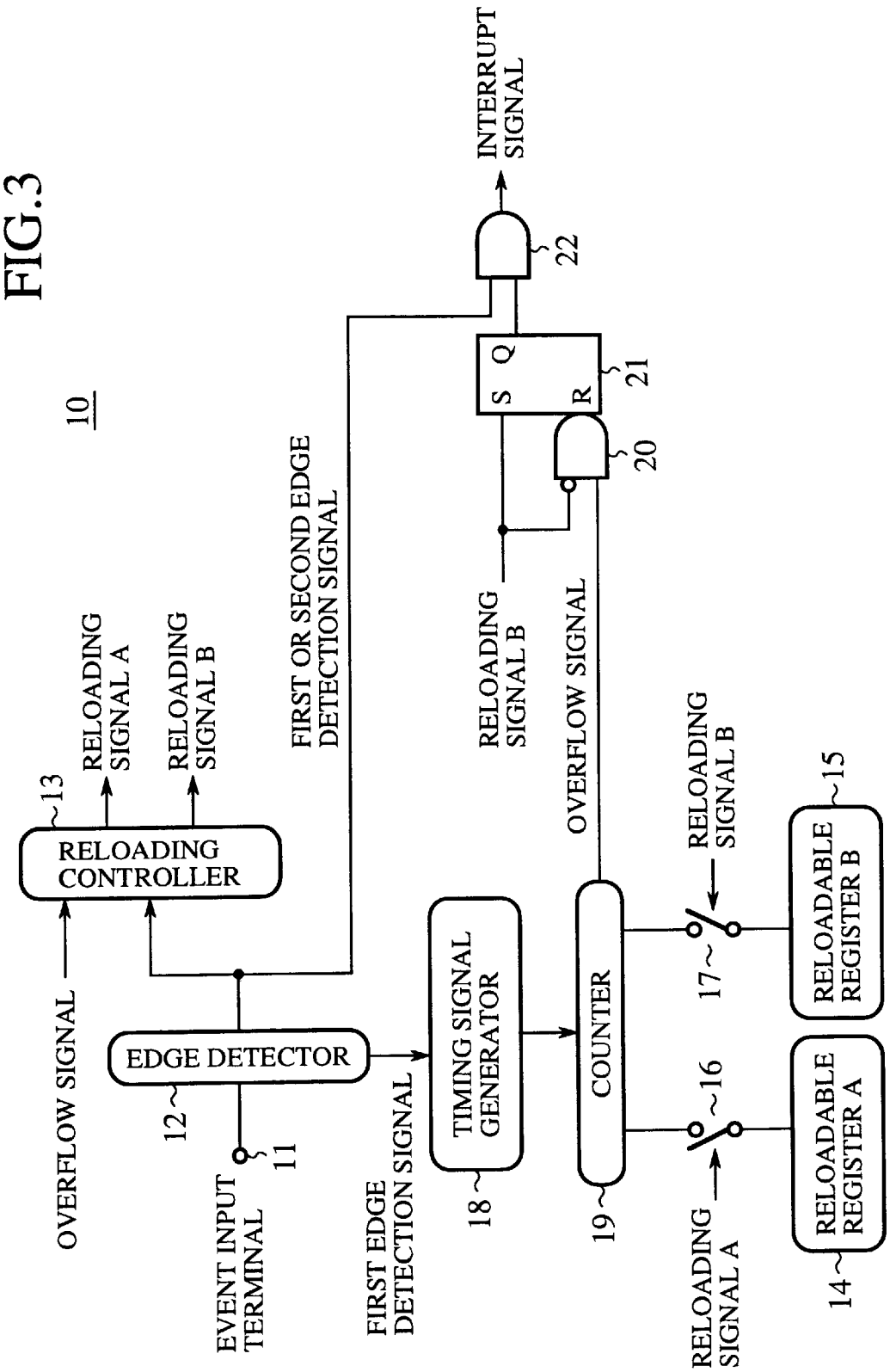
FIG. 3 is a block diagram showing a configuration of special-purpose hardware of the embodiment 1 of the microcomputer in accordance with the present invention.

FIG. 3 is a block diagram showing a configuration of the special-purpose hardware in detail. In FIG. 3, the reference numeral 11 designates an event input terminal for inputting the pulse signal 8 from the remote controller; and 12 designates an edge detector for detecting an edge of the input pulse signal 8.

The reference numeral 13 designates a reloading controller for producing a reloading signal A when the edge detector 12 detects a first edge, and for producing a reloading signal B in response to an overflow signal described below; 14 designates a reloadable register A for holding in advance a count value n1 corresponding to an ineffective interval (a predetermined time period); 15 designates a reloadable register B for holding in advance a count value n2 corresponding to an effective interval (effective interval); 16 and 17 designate switches turning on in response to the reloading signals A and B from the reloading controller 13; 18 designates a timing signal generator for generating a clock signal in response to a first edge detection signal fed from the edge detector 12; 19 designates a counter for counting the clock signal fed from the timing signal generator 18, with decrementing the count value n1 or n2 held in the reloadable registers 14 and 15, and producing an overflow signal when its count becomes zero; 20 designates a NAND circuit for ANDing the negation of the reloading signal B fed from the reloading controller 13 and the overflow signal fed from the counter 19; and 21 designates an RS flip-flop with its S input terminal connected to the reloading signal B fed from the reloading controller 13, and its R input terminal connected to the output signal of the NAND circuit 20. The foregoing components 13–21 constitute an effective interval setting means.

The reference numeral 22 designates an AND circuit for generating an interrupt signal for changing the operation mode from the low current consumption mode to the normal operation mode, when the edge detector 12 detects a second edge in the effective interval enabled by an enabling signal output from the Q output terminal of the RS flip-flop 21.

Figure 4:
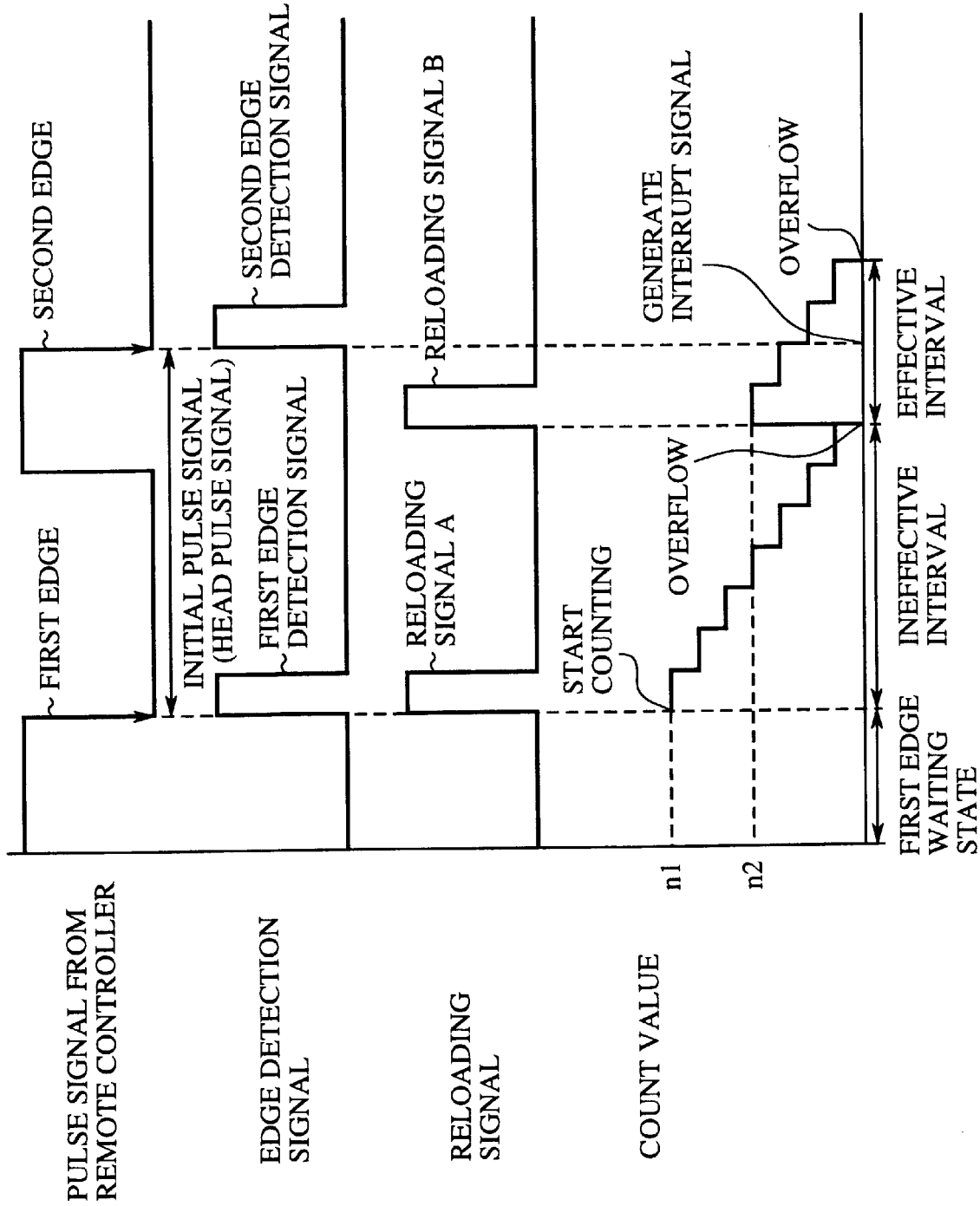
FIG. 4 is a timing chart illustrating the operation of the special-purpose hardware of the embodiment 1 of the microcomputer in accordance with the present invention.

Next, the operation of the present embodiment 1 will be described with reference to a timing chart of FIG. 4 illustrating the operation of the special-purpose hardware of the present embodiment 1.

In FIGS. 1 and 2, to reduce useless power consumption during power down, the microcomputer 1 installed in the electronic equipment or the like includes the oscillator 3 of the sub-clock 3a for small current consumption in addition to the oscillator 2 of the main clock 2a. The microcomputer 1 changes its operation mode from the low current consumption mode using the sub-clock 3a as the system clock to the normal operation mode using the main clock 2a as the system clock in response to an event.

In the low current consumption mode as shown in FIG. 1, the shadowed oscillator 2, CPU 4 and timing generator 5 are halted, with only the peripheral hardware 6 and special-purpose hardware 10 being partially operable according to the sub-clock 3a.

When the pulse signal 8 associated with an external event is input from the remote controller to the special-purpose hardware 10, the special-purpose hardware 10 detects an edge of the pulse signal 8. When identifying the pulse signal 8 as the head pulse signal, the special-purpose hardware 10 supplies the peripheral hardware 6 with the interrupt signal. The peripheral hardware 6 activates the oscillator 2 as the main clock 2a as shown in FIG. 2, followed by activating the timing generator 5 to generate the operation clock signal of the CPU 4 corresponding to the main clock 2a, thereby bringing the CPU 4 into operation.

Thus, the special-purpose hardware 10 in connection with the peripheral hardware 6 switches the operation mode from the low current consumption mode using the sub-clock 3a as the system clock to the normal operation mode using the main clock 2a as the system clock in response to the identification of the pulse signal 8 fed from the remote controller as the head pulse signal.

Referring to FIGS. 3 and 4, the detection operation of the head pulse signal by the special-purpose hardware 10 will be described.

The edge detector 12 outputs the first edge detection signal when it detects the first edge of the pulse signal 8 supplied from the remote controller to the event input terminal 11 in a first edge waiting mode. The first edge detection signal is supplied to the AND circuit 22. In this case, the S input terminal of the RS flip-flop 21 is not yet supplied with the reloading signal B. Thus, the Q output terminal of the RS flip-flop 21 does not output the enabling signal, and hence the AND circuit 22 does not output the interrupt signal.

Receiving the first edge detection signal, the reloading controller 13 produces the reloading signal A, turning on the switch 16. Thus, the reloadable register A 14 sets the prestored count value n1 to the counter 19. The timing signal generator 18 generates a clock signal in response to the first edge detection signal from the edge detector 12, and supplies it to the counter 19, thereby causing the counter 19 to start decrementing the count value n1 (start of the ineffective interval).

Completing the decrement of the count value n1, the counter 19 supplies the overflow signal to the reloading controller 13 and NAND circuit 20 (end of the ineffective interval). The reloading controller 13, receiving the overflow signal, produces the reloading signal B to turn on the switch 17, in response to which the reloadable register B 15 sets the prestored count value n2 to the counter 19.

At the same time, the reloading controller 13 supplies the reloading signal B to the S input terminal of the RS flip-flop 21. In response to the reloading signal B, the RS flip-flop 21 outputs the enabling signal from its Q output terminal (start of the effective interval).

The counter 19 starts decrementing the count value n2, and when completing the decrement, it supplies the overflow signal to the NAND circuit 20. In this case, since the input of the reloading signal B is disabled, the NAND circuit 20 ANDs its inverted signal and the overflow signal, and supplies the enabling signal to the R input terminal of the RS flip-flop 21. Thus, the RS flip-flop 21 outputs a disabling signal from its Q output terminal (end of effective interval).

Accordingly, when the edge detector 12 detects the second edge of the pulse signal 8 supplied from the remote controller through the event input terminal 11 during the effective interval, which begins from the output of the overflow signal of the count value n1 and continues to the output of the overflow signal of the count value n2 by the counter 19, the AND circuit 22 outputs the interrupt signal in response to the second edge detection signal and the enabling signal from the Q output terminal of the RS flip-flop 21. In contrast, when the edge detector 12 does not detect the second edge during the effective interval, the first edge waiting mode is started again.

As described above, the present embodiment 1 is configured such that it establishes the ineffective interval and effective interval according to the timing of the first edge and second edge of the head pulse signal, and sets the count values n1 and n2 in the reloadable registers A 14 and B 15 in accordance with the ineffective interval and effective interval, respectively, so that only when the first edge and second edge are input from the event input terminal 11 at a predetermined interval, that is, only when the head pulse signal is input, the present embodiment 1 can generate the interrupt signal for changing the mode from the low current consumption mode to the normal operation mode. This makes it possible to prevent an undesired mode transition from taking place by noise, thereby improving the mode transition identification rate. Thus, the present embodiment 1 can make more effective use of the low current consumption mode.

Furthermore, since the predetermined intervals of the first edge and second edge can be determined by only setting the count values n1 and n2 corresponding to the ineffective interval and effective interval into the reloadable registers A 14 and B 15, the ineffective interval and effective interval can be set easily.

Although the present embodiment 1 sets the first edge and second edge for the initial pulse of the head pulse signal, this is not essential. The first edge and second edge can be set not only for the initial pulse, but also for any other pulse as long as the pulse belongs to the head pulse signal, offering a similar effect.

Furthermore, although the present embodiment 1 is configured such that the counter 19 decrements the count value n1 or n2, this is not essential. For example, the counter 19 can increment its count up to the count value n1 or n2, and output the overflow signal, achieving the same effect.

Embodiment 2

Although in the foregoing embodiment 1, the special-purpose hardware 10 generates the interrupt signal for changing the operation mode from the low current consumption mode to the normal operation mode in response to the detection of the head pulse signal, in the present embodiment 2, the special-purpose hardware 10 generates an interrupt signal in response to the detection of the head pulse signal and data pulse signal.

Figure 5:
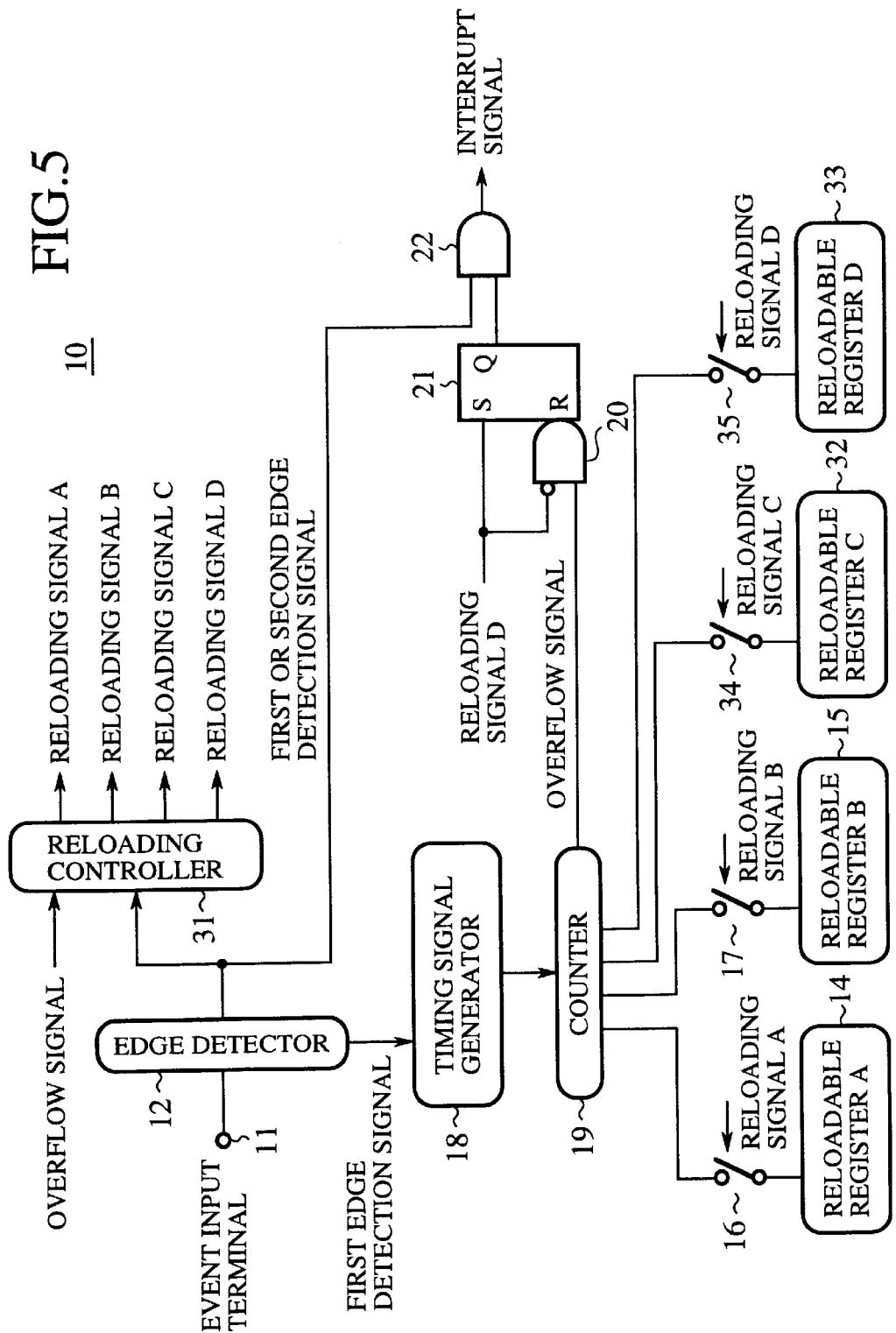
FIG. 5 is a block diagram showing a configuration of the special-purpose hardware of an embodiment 2 of the microcomputer in accordance with the present invention.

FIG. 5 is a block diagram showing a configuration of a special-purpose hardware in the embodiment 2 in accordance with the present invention. In this figure, the reference numeral 31 designates a reloading controller for producing a reloading signal A when the edge detector 12 detects a first edge, for producing a reloading signal B in response to the overflow signal supplied from the counter 19, for producing a reloading signal C when the edge detector 12 detects a second edge, and for producing a reloading signal D in response to an input of the overflow signal; 14 designates a reloadable register A for holding in advance a count value n1 corresponding to a first ineffective interval (predetermined time period); and 15 designates a reloadable register B for holding in advance a count value n2 corresponding to a first effective interval (first effective interval). The reloadable registers A 14 and B 15 are the same as those as shown in FIG. 3. The reference numeral 32 designates a reloadable register C for holding in advance a count value n3 corresponding to a second ineffective interval (predetermined time period); and 33 designates a reloadable register D for holding in advance a count value n4 corresponding to the second effective interval (second effective interval). Reference numerals 34 and 35 designate switches turned on in response to the reloading signals C and D from the reloading controller 31, respectively.

Although the remaining configuration is the same as that shown in FIG. 3 except that the counter 19 also outputs its overflow signal when its count value becomes zero by decrementing it from the value n3 or n4 held in the reloadable register 34 or 35, and that the NAND circuit 20 and the S input terminal of the RS flip-flop 21 are supplied not with the reloading signal B but with the reloading signal D.

The foregoing components 14–21 and 31–35 constitute an effective interval setting means.

Next, the operation of the present embodiment 2 will be described with reference to FIG. 6, a timing chart illustrating the operation of the special-purpose hardware 10 in the present embodiment 2.

Figure 6:
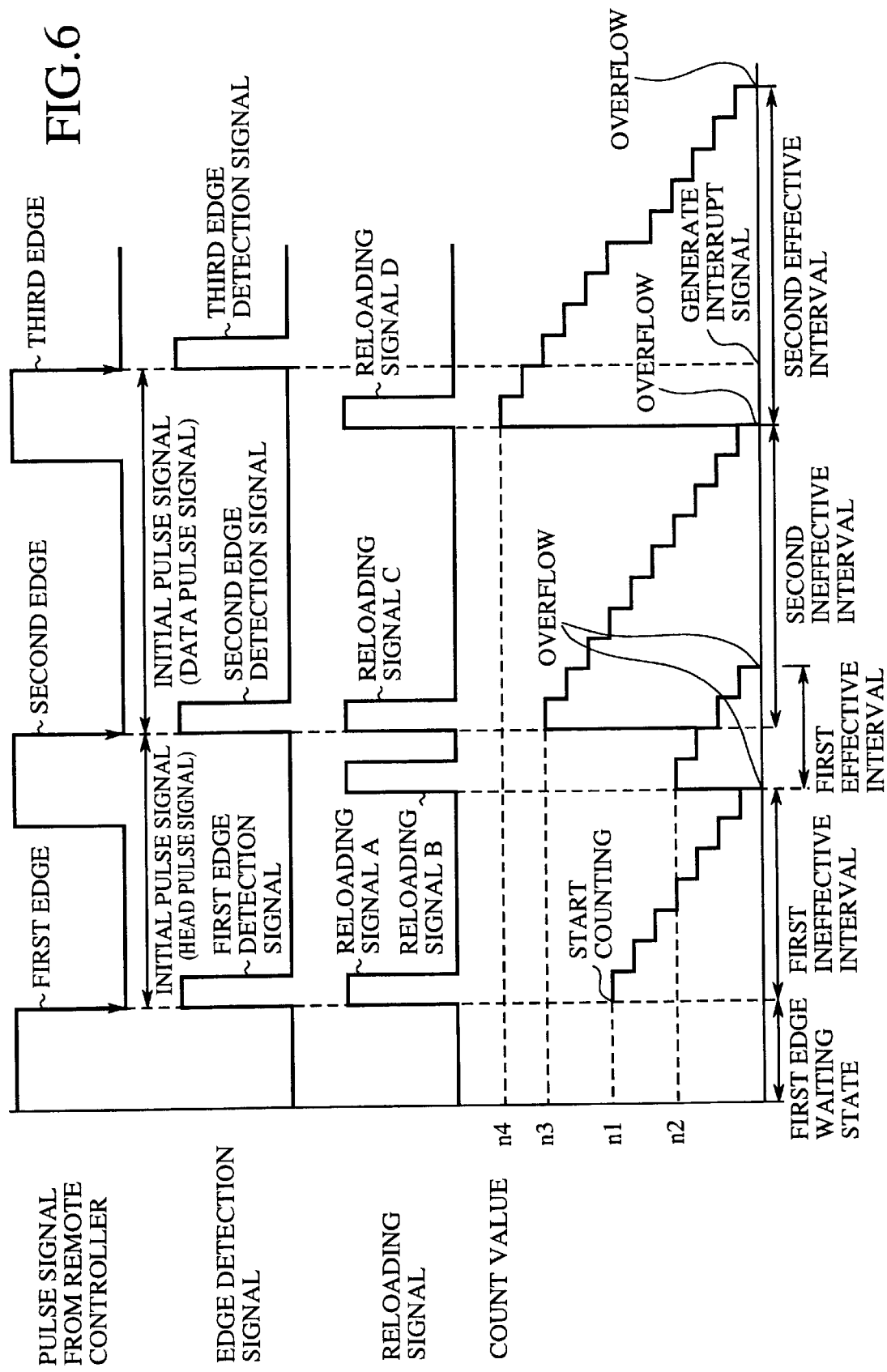
FIG. 6 is a timing chart illustrating the operation of the special-purpose hardware of the embodiment 2 of the microcomputer in accordance with the present invention.

Referring to FIGS. 5 and 6, the detection of the head pulse signal and data pulse signal by the special-purpose hardware 10 will be described.

The operation up to the detection of the second edge by the edge detector 12 is the same as that in the foregoing embodiment 1: The head pulse signal is considered to be detected when the edge detector 12 detects the second edge within the first effective interval that begins when the counter 19 starts decrementing the count value n2, and ends at the end of the decrement of the count value n2. Receiving the second edge detection signal, the reloading controller 31 outputs the reloading signal C to turn on the switch 34, so that the reloadable register C 32 sets the prestored count value n3 to the counter 19. Thus, the counter 19 starts decrementing the count value n3 (start of the second ineffective interval).

Completing the decrement of the count value n3, the counter 19 supplies its overflow signal to the reloading controller 31 and NAND circuit 20 (end of the second ineffective interval). Receiving the overflow signal, the reloading controller 31 outputs the reloading signal D to turn on the switch 35, in response to which the reloadable register D 33 places the prestored count value n4 into the counter 19.

At the same time, the reloading controller 31 supplies the S input terminal of the RS flip-flop 21 with the reloading signal D, in response to which the RS flip-flop 21 outputs an enabling signal from its Q output terminal (start of the second effective interval).

The counter 19 starts decrementing the count value n4, and when completing the decrement of the count value n4, it supplies its overflow signal to the NAND circuit 20. In this case, since the input of the reloading signal D is a disabling signal, the NAND circuit 20, which ANDs its inverted signal and the overflow signal, supplies the R input terminal of the RS flip-flop 21 with an enabling signal so that the RS flip-flop 21 is reset and produces a disabling signal from its Q output terminal (end of the second effective interval).

Accordingly, when the edge detector 12 detects the third edge of the pulse signal 8 fed from the remote controller through the event input terminal 11 during the second effective interval, which starts when the counter 19 outputs the overflow signal of the count value n3 and ends when it outputs the overflow signal of the count value n4, the AND circuit 22 produces the interrupt signal in response to the third edge detection signal and the enabling signal from the Q output terminal of the RS flip-flop 21. When the edge detector 12 does not detect the third edge during the second effective interval, the microcomputer enters the first edge waiting mode, again.

As described above, the present embodiment 2 is configured such that it establishes the first ineffective and effective intervals, and second ineffective and effective intervals in response to the timing of the first edge, second edge and third edge of the head pulse signal; and sets the count values n1–n4 to the reloadable registers A 14–D 33 in accordance with the first ineffective and effective intervals, and the second ineffective and effective intervals. This enables the interrupt signal for changing the operation mode from the low current consumption mode to the normal operation mode to be generated only when the first edge, second edge and third edge are supplied at the predetermined timing from the event input terminal 11, that is, only when the head pulse signal and data pulse signal are input. Thus, the present embodiment can positively prevent the mode transition due to noise, and can make more effective use of the low current consumption mode by improving the mode transition identification rate.

In addition, only by setting into the reloadable registers A 14–D 33 the count values n1–n4 corresponding to the first ineffective and effective intervals and to the second ineffective and effective intervals, the intervals between the first edge, second edge and third edge can be established, making it possible to easily set the first and second ineffective intervals, and the first and second effective intervals.

Although the first edge and second edge are set with regard to the initial pulse of the head pulse signal in the present embodiment 2, they are not limited to the initial pulse, but can be set for any other pulses as long as they belong to the head pulse signal, offering a similar effect.

Furthermore, although the counter 19 decrements the count values n1–n4 in the present embodiment 2, it can increment its values up to the count value n1–n4 to output the overflow signals, offering a similar effect.

Embodiment 3

Although the counter 19 counts the count values n1 and n2 according to the same count source output from the timing signal generator 18 in the foregoing embodiment 1, the counter of the present embodiment 3 counts the same count value n1 according to different count sources.

Figure 7:
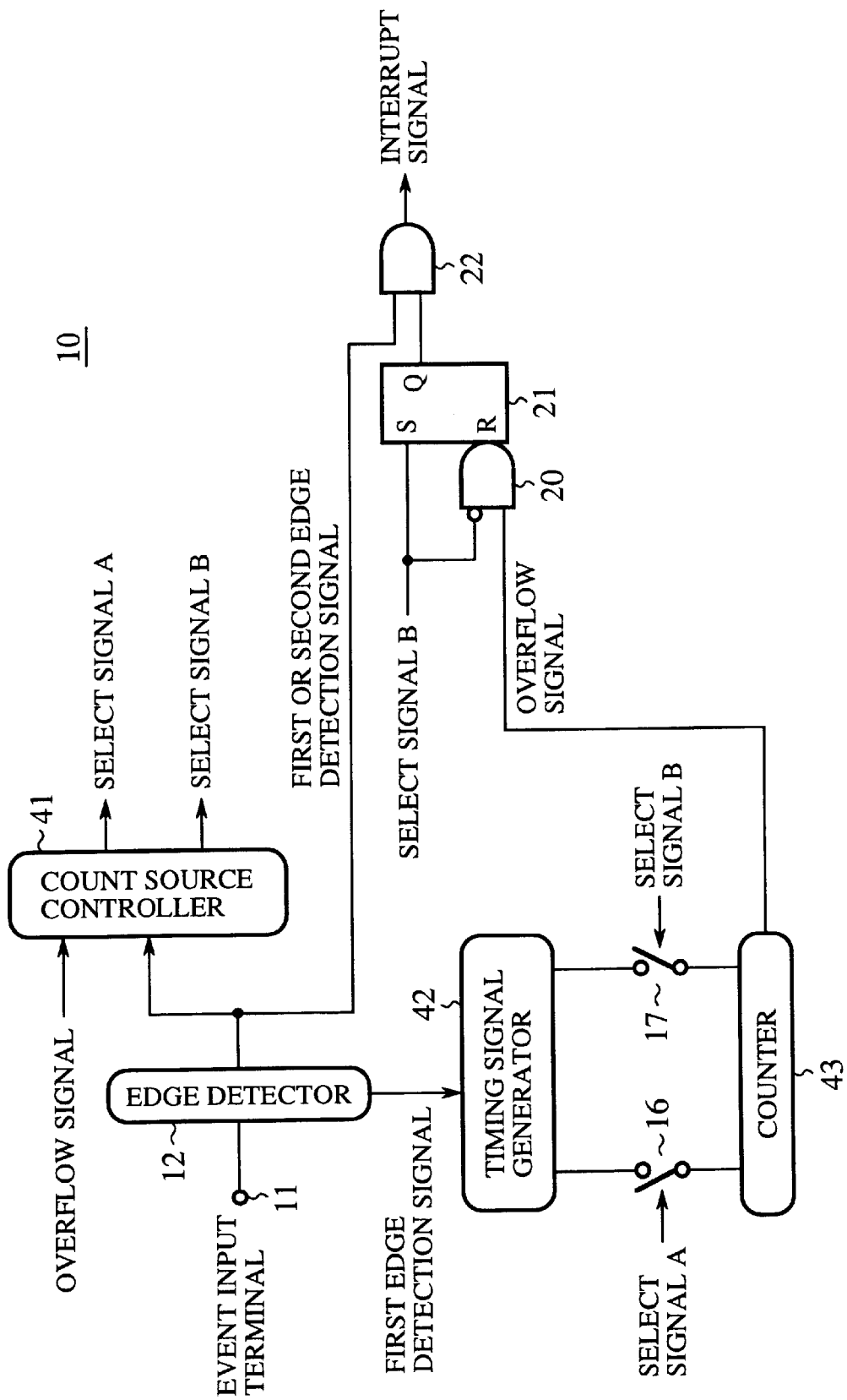
FIG. 7 is a block diagram showing a configuration of the special-purpose hardware of an embodiment 3 of the microcomputer in accordance with the present invention.

FIG. 7 is a block diagram showing a configuration of a special-purpose hardware 10 of the present embodiment 3 of the microcomputer in accordance with the present invention. In FIG. 7, the reference numeral 41 designates a count source controller for outputting a select signal A when the edge detector 12 detects the first edge, and a select signal B in response to the overflow signal of a counter 43; 42 designates a timing signal generator including a frequency divider for generating a count source A of a low clock frequency and a count source B of a high clock frequency in response to the first edge detection signal fed from the edge detector 12; and 43 designates the counter for holding a count value n1 in advance, decrements it in response to the count source A or B from the timing signal generator 42, and outputs an overflow signal when the count value becomes zero.

The remaining configuration is the same as that of FIG. 3, except that the select signal B is supplied to the NAND circuit 20 and the S input terminal of the RS flip-flop 21 instead of the reloading signal B.

The components 16, 17, 20, 21 and 41–43 constitute an effective interval setting means.

Next, the operation of the present embodiment 3 will be described with reference to FIG. 8, a timing chart illustrating the operation of the special-purpose hardware 10 of the present embodiment 3.

Figure 8:
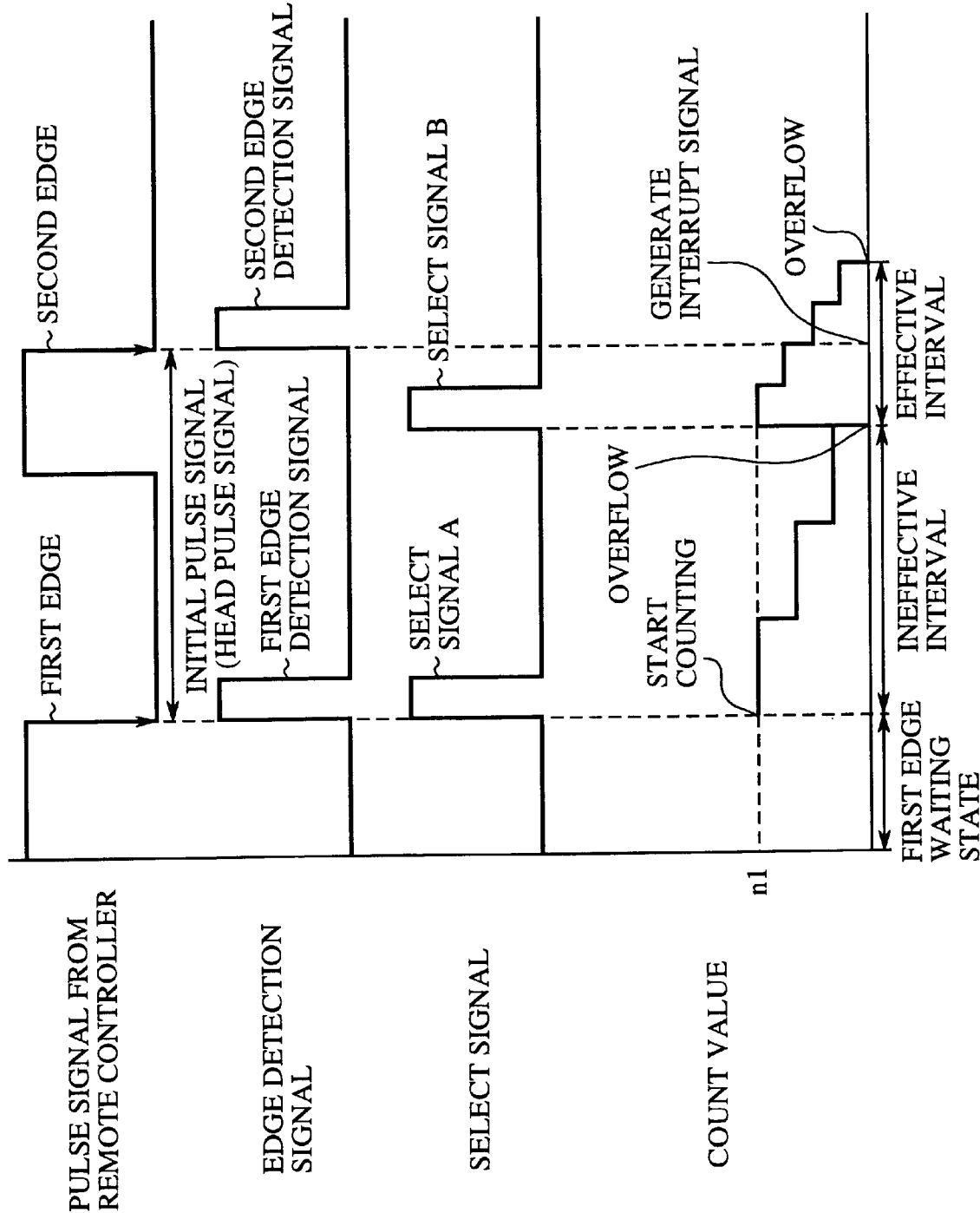
FIG. 8 is a timing chart illustrating the operation of the special-purpose hardware of the embodiment 3 of the microcomputer in accordance with the present invention.
Figure 9:
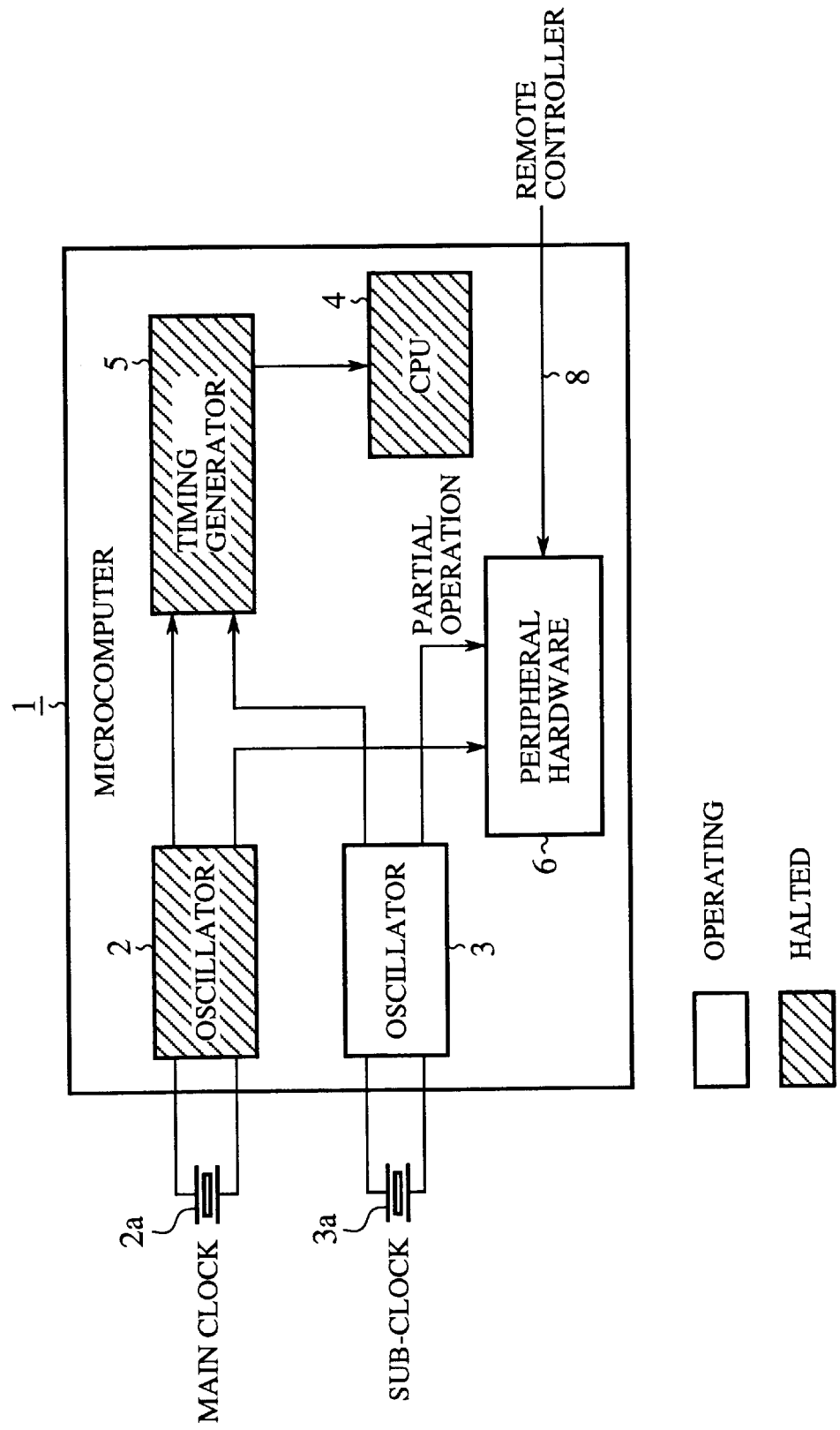
FIG. 9 is a block diagram showing a configuration of a conventional microcomputer in the low current consumption mode.
Figure 10:
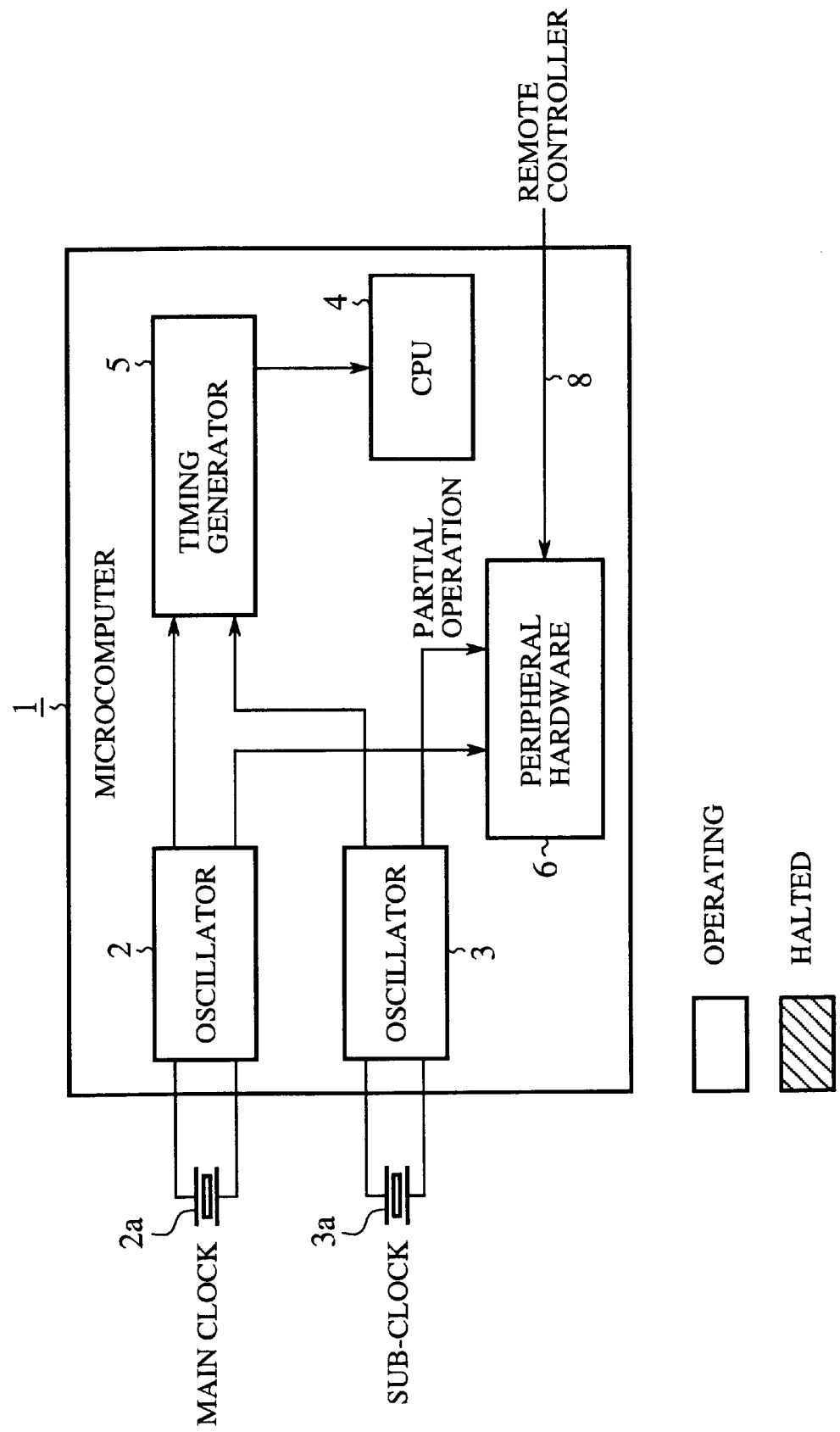
FIG. 10 is a block diagram showing a configuration of the conventional microcomputer in the normal operation mode.

Referring to FIGS. 7 and 8, the detection of the head pulse signal and data pulse signal of the special-purpose hardware 10 will be described.

The timing signal generator 42 generates the count source A with the low clock frequency and count source B with the high clock frequency according to the first edge detection signal from the edge detector 12.

The count source controller 41 outputs the select signal A in response to the first edge detection signal fed from the edge detector 12, thereby turning on the switch 16. The counter 43 decrements the prestored count value n1 in response to the count source A from the timing signal generator 42, and outputs the overflow signal when its count value becomes zero (ineffective interval).

Receiving the overflow signal, the count source controller 41 outputs the select signal B to turn on the switch 17. When the switch 17 is turned on, the counter 43 decrements the prestored count value n1 according to the count source B from the timing signal generator 42, and outputs the overflow signal when its count value becomes zero (effective interval).

Thus, the ineffective interval and effective interval can be set even when the counter 43 counts the same count value n1 according to the count source A and B with different clock frequencies, and when the edge detector 12 detects the second edge in the effective interval, the AND circuit 22 generates the interrupt signal.

As described above, the present embodiment 3 is configured such that it establishes the ineffective interval and effective interval corresponding to the timing of the first edge and second edge of the head pulse signal; sets the count value n1 associated with both the ineffective interval and effective interval into the counter 43; and sets the clock frequency of the count source A or B in the timing signal generator 42. This enables the interrupt signal for changing the operation mode from the low current consumption mode to the normal operation mode to be generated only when the first edge and second edge are input through the event input terminal 11 at the predetermined intervals, that is, only when the head pulse signal is input, thereby preventing the mode transition due to noise, and making more effective use of the low current consumption mode by improving the mode transition identification rate.

Furthermore, the present embodiment 3 has an advantage over the foregoing embodiment 1 that it can obviate the need for the reloadable registers A 14 and B 15, and hence can reduce the size of the circuit.

Although the embodiment 3 is applied to the configuration of the embodiment 1 in the description above, it is also applicable to the foregoing embodiment 2.

In addition, although the counter 43 decrements the count value n1 in the present embodiment 3, it can increment the count value up to the count value n1 to output the overflow signal, offering a similar effect.

What is claimed is:

1. A microcomputer comprising:

an edge detector for detecting a first edge and a second edge of a pulse signal supplied from a remote controller;

effective interval setting means for setting an effective interval after a predetermined time period has elapsed from the time said edge detector detects the first edge; and interrupt control means for generating an interrupt signal for changing an operation mode from a low current consumption mode to a normal operation mode when said edge detector detects the second edge during the effective interval.

2. A microcomputer comprising:

an edge detector for detecting a first edge, a second edge and a third edge of a pulse signal supplied from a remote controller;

effective interval setting means for setting a first effective interval after a first predetermined time period has elapsed from the time said edge detector detects the first edge, and for setting a second effective interval after a second predetermined time period has elapsed from the time the edge detector detects the second edge during the first effective interval; and interrupt control means for generating an interrupt signal for changing an operation mode from a low current consumption mode to a normal operation mode when said edge detector detects the third edge during the second effective interval.

3. The microcomputer according to claim 1, wherein said effective interval setting means comprises:

a plurality of reloadable registers for holding count values corresponding to the predetermined time period and to the effective interval; and a counter for counting each of the count values held in said reloadable registers to determine the predetermined time period and the effective interval.

4. The microcomputer according to claim 2, wherein said effective interval setting means comprises:

a plurality of reloadable registers for holding count values corresponding to the first and second predetermined time periods and to the first and second effective intervals; and a counter for counting each of the count values held in said reloadable registers to determine the first and second predetermined time periods and the first and second effective intervals.

5. The microcomputer according to claim 1, wherein said effective interval setting means comprises a counter for counting a count value according to count sources corresponding to the predetermined time period and the effective interval, and for setting the predetermined time period and effective interval in response to an overflow of said counter.

6. The microcomputer according to claim 2, wherein said effective interval setting means comprises a counter for counting a count value according to count sources corresponding to the first and second predetermined time periods and to the first and effective intervals, and for setting the first and second predetermined time periods and the first and second effective intervals in response to an overflow of said counter.

* * * * *